Figure 1:
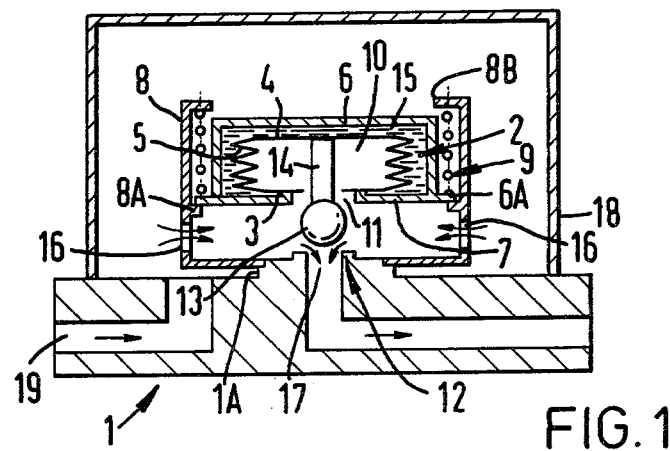

United States Patent [19]

Clayton et al.

[11] 4,295,605
[45] Oct. 20, 1981

[54] STEAM TRAPS

[75] Inventors: Edward R. C. Clayton, Martock; Alan F. Bennett, Cheltenham, both of England

[73] Assignee: Spirax Sarco Limited, Gloucestershire, England

[21] Appl. No.: 114,408

[22] Filed: Jan. 22, 1980

[30] Foreign Application Priority Data

Jan. 26, 1979 [GB] United Kingdom ............... 02777/79

[51] Int. Cl.³ .............................................. F16T 1/10
[52] U.S. Cl. .................................. 236/56; 236/93 A; 236/99 J
[58] Field of Search ..................... 236/56–58, 236/99 J, 99 R, 42, 93 A

[56] References Cited

U.S. PATENT DOCUMENTS

| 1,467,818 | 9/1923 | Smith | 236/56 |
| 1,484,395 | 2/1924 | Jenkins | 236/56 |
| 2,289,020 | 7/1942 | Jones | 236/58 |
| 2,628,783 | 2/1953 | Fernald | 236/58 |
| 3,494,197 | 2/1970 | Schmidt | 236/99 R |

FOREIGN PATENT DOCUMENTS 225927 9/1910 Fed. Rep. of Germany ........ 236/56

Primary Examiner—William E. Tapolcai, Jr.
Attorney, Agent, or Firm—Larson and Taylor

[57] ABSTRACT

A thermostatic steam trap having a balanced pressure thermostatic element (2,2A,2B) operated by volatile fluid (15) is disclosed in which an internal void (10) of the element is open to steam/condensate within the trap, and in which the volatile fluid fills a housing (6) outside the element when the trap is fully open thereby to support the element against high pressure within the element. In the trap fully-closed condition the element adopts a nearly nesting condition so that if the element is then subjected to higher pressure externally it adopts a fully nesting condition in which it can withstand great external pressure.

6 Claims, 3 Drawing Figures

STEAM TRAPS

This invention relates to steam traps.

The invention is particularly concerned with thermostatic steam traps having a so-called "balanced pressure" thermostatic element which in one type of trap takes the form of a sealed bellows with a rigid metal top and bottom, but with a side wall which will lengthen or shorten if the rigid ends are pulled apart or pushed together. The rigid top is fast with the body of the trap whilst the rigid bottom carries the valve member of the trap. The bellows is filled with a volatile fluid. In operation this fluid is heated by condensate present in the trap such that at a condensate temperature at or above a predetermined temperature t below the saturated steam temperature corresponding to the pressure at the trap, the bellows is sufficiently expanded for the valve member to be seated on its seat to close the trap. At condensate temperatures below t the bellows is collapsed and the trap is open.

According to the present invention there is provided a thermostatic steam trap having a balanced pressure thermostatic element with an internal void that is open to steam/condensate within the trap and that is sealed from the interior of a housing in which the element is mounted; this housing containing, outside the element, volatile fluid that fills the housing outside the element when the trap is fully open thereby to support the element; the element being movable by pressure exerted by the volatile fluid upon heating of the fluid to urge a valve member carried by the element on to a valve seat to close the trap; the element, in the trap fully-closed condition, being in a nearly nesting condition and adopting a fully nesting condition if further heating of the volatile fluid occurs. The thermostatic element may be a bellows or a multi-diaphragm arrangement. In such a trap the thermostatic element has a fast, positive response to temperature and pressure changes but can withstanding severe overpressurisation due either to waterhammer or superheat, either of which conditions may occur in a steam system. In the case of waterheammer, during which high hydraulic pressure can be generated inside the element, the element is supported against deformation by the volatile fluid. If super-heating occurs causing the volatile fluid to generate high pressure outside the element, the element fully nests in which condition it can withstand great pressure.

Figure 2A:
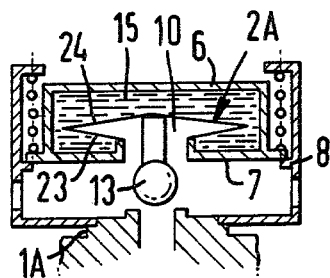
Figure 2B:
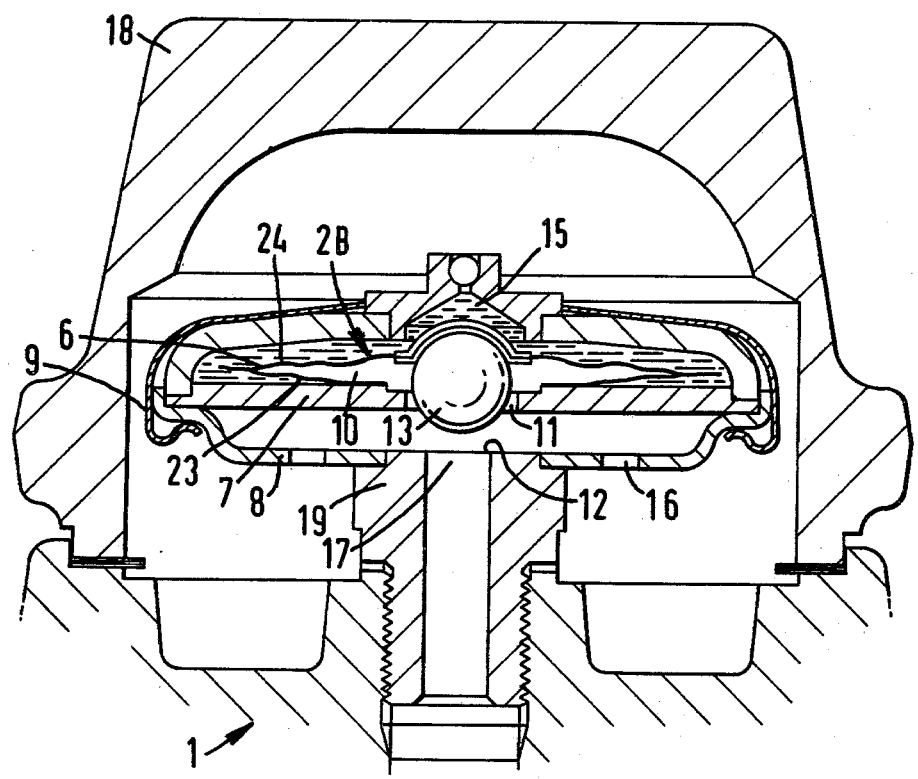

For a better understanding of the invention and to show how the same may be carried into effect, reference will now be made, by way of example, to the accompanying drawings, in which:

FIG. 1 is a somewhat diagrammatic sectional side view of part of a steam trap, and FIG. 2A and 2B are similar views of the major parts of two further forms of steam trap.

The steam traps shown in the Figures are balanced pressure thermostatic traps having a base which carries the thermostatic element of the trap. In the trap of FIG. 1 this element is in the form of a bellows 2 having rigid end walls 3 and 4 and a side wall 5 that can shorten or lengthen. The bellows 2 is disposed within a housing 6 with its lower end wall 3 fast with a bottom wall 7 of the housing 6. The upper end wall 4 is free to move up and down in the housing 6.

The housing 6 is disposed within a casing 8 that is mounted on a spigot 1A on the base 1, the housing 6 being held against a flange 8A of the casing 8 by an overload spring 9 acting between a further flange 8B of the casing 8 and a flange 6A of the housing 6.

The interior void 10 of the bellows 2 is open to the casing 8 below the flange 8A via an aperture 11 in the housing wall 7, the connection between the bellows end wall 3 and the housing wall 7 sealing the interior of the housing 6 (outside the bellows 2) from the casing 8. Below the aperture 11 there is a valve seat 12, formed in the spigot 1A, on which can seat a valve member 13 that is carried by a stem 14 depending from the upper bellows wall 4 and extending through the aperture 11 so that the valve member 13 moves with the upper wall 4.

The interior of the housing 6, outside the bellows 2, is filled with volatile fluid 15.

The casing 8 is contained within a cover 18 that is mounted on the base 1 so that the interior of the trap is sealed from the atmosphere. Ports 16 in the casing 8 below the flange 8A place the interior of this part of the casing 8 in communication with the interior of the cover 18.

In service the trap is mounted in a steam flow line with a port 19 in the base 1 in connection with the flow line. In operation, before steam is turned on, the trap adopts the condition shown in FIG. 1-bellows 2 expanded, valve 12/13 open, housing 6 seated on flange 8A. When the steam is first turned on condensate passes through the port 19 into the interior of the cover 18 and, via the ports 16, out through the port 17 at the valve seat 12. As warmer condensate reaches the trap, heat is transmitted to the volatile fluid 15 which expands with the result that the bellows 2 begins to be forced to collapse thereby moving the valve member 13 closer to the valve seat 12. At a predetermined temperature t below the saturated steam temperature corresponding to the pressure at the trap, the volatile fluid 15 boils and begins to exert vapour pressure. When the inside of the bellows 2 is at steam pressure, the outside, because of the termperature head, is at a pressure which is higher by an amount p. This excess pressure forces the bellows 2 to collapse further and hence forces the valve member 13 down onto its seat 12. Thus the trap closes just before steam temperature is reached. Condensate is then held up in the trap until it has cooled to the temperature t below steam temperature. At this point the vapour pressure in the housing 6 is less than the steam pressure inside the bellows 2 so that the bellows 2 is able to expand again and the valve member 13 therefore lifts off the valve seat 12.

The volatile fluid can be a mixture of water and another fluid having a boiling point less than water.

The volatile fluid is selected such that the graphs (pressure against temperature) of the volatile fluid and of water alone are nearly parallel and therefore, no matter what the steam pressure may be in the trap, at substantially any temperature t below the saturated steam temperature the volatile fluid begins to boil to cause the trap to shut.

It is to be noted in the trap of FIG. 1 it is arranged that when the bellows 2 is fully expanded—trap fully open—the volatile fluid 15 completely fills the interior of the housing 6 outside the bellows 2. Thus in this condition the bellows 2 is fully supported and a surge in line pressure, due for example to waterhammer, is prevented from expanding the bellows further. The bellows cannot be overstretched and so cannot be damaged by waterhammer.

In the other extreme condition—trap fully closed bellows fully collapsed—it is arranged that the leaves of the bellows 2 are then very nearly touching. If superheated steam is present, having the effect of vapourising the volatile fluid still further, the small amount of movement necessary to permit the leaves of the bellows fully to nest as a result of this further heating is taken up by the housing 6 lifting off the flange 8A against the action of the overload spring 9. Thus excessive pressure of the volatile fluid caused by overheating causes the bellows to adopt a fully nested condition and once this is reached the bellows can withstand great pressure without damage.

FIGS. 2A and 2B show balanced pressure thermostatic traps having thermostatic elements that are multi-diaphragm arrangements 2A (FIG. 2A) or 2B (FIG. 2B), the traps otherwise being the same as the trap of FIG. 1. Thus in each case there are two diaphragms 23, 24 sealed to one another at their peripheries so as to define an interior void 10 that is open to the casing 8. As in the case of the trap of FIG. 1, the lower diaphragm 23 is fast with the bottom wall 7 of the housing 6 whilst the upper diaphragm 24 is free to move up and down and carries the valve member 13. The interior of the housing 6, outside the diaphragm arrangement 2A or 2B, is filled with volatile fluid 15 and each of these traps operates in the same way as the trap of FIG. 1.

In the case of FIG. 2A each diaphragm 23,24 is of frusto-conical form in its relaxed condition. The diaphragms 23,24 of FIG. 2B are of corrugated form.

As in the case of FIG. 1, in the trap fully open condition the diaphragm arrangement 2A or 2B is fully supported by the volatile fluid which completely fills the interior of the housing outside the diaphragm arrangement in this condition. In the trap fully closed condition the individual diaphragms are nearly touching, and fully nest if further heating occurs.

We claim:

1. A thermostatic steam trap comprising a base; a cover mounted on the base, the base and cover defining a hollow interior of the trap; a casing within said interior fast with the base and cover; a housing movably mounted in the casing; resilient means urging the housing to seat in the casing; a balanced pressure thermostatic element mounted in the housing; a valve member carried by the thermostatic element; an inlet port to said interior; an outlet port from said interior; and a valve seat in the outlet port; the casing locating the housing and the thermostatic element with respect to the outlet port so that the valve member carried by the thermostatic element co-operates with the valve seat in the outlet port for opening and closing the trap; the element defining an internal void that is open to steam/condensate within the trap and that is sealed from the interior of the housing in which the element is mounted; the housing having its interior sealed from said interior of the trap and containing volatile fluid which entirely fills the housing outside the element when the trap is fully open thereby to support the element; the element being moved by the pressure exerted by the volatile fluid upon heating of the fluid to urge the valve member carried by the element on to the valve seat to close the trap with the element, in the trap fully-closed condition, being in a nearly nesting condition; the housing moving away from its seating condition in the casing, against the action of said resilient means; to permit the element to adopt a fully nesting condition if further heating of the volatile fluid occurs.

2. A steam trap as claimed in claim 1, wherein the thermostatic element is a bellows.

3. A steam trap as claimed in claim 1, wherein the thermostatic element is a multi-diaphragm arrangement.

4. A steam trap as claimed in claim 3, wherein there are two opposed diaphragms each of frustoconical form.

5. A steam trap as claimed in claim 3, wherein there are two opposed diaphragms each of corrugated form.

6. A steam trap as claimed in claim 1, wherein the valve member is fast with an upper wall of the thermostatic element which wall moves up and down in the housing in dependence upon contraction or expansion of the volatile fluid in the housing; and wherein the internal void of the element is open to the steam/condensate through an aperture in the bottom wall of the housing through which aperture the valve member co-operates with its seat.

* * * * *